United States Patent

[11] 3,548,847

| [72] | Inventor | William G. Roven |
| | | Southgate, Mich. |
| [21] | Appl. No. | 827,398 |
| [22] | Filed | May 23, 1969 |
| [45] | Patented | Dec. 22, 1970 |
| [73] | Assignee | Ford Motor Company |
| | | Dearborn, Mich. |
| | | a corporation of Delaware |

[54] FUEL TANK VAPOR SEPARATOR SYSTEM
8 Claims, 4 Drawing Figs.

[52] U.S. Cl....................................................... 137/43,
  137/202, 137/423; 220/44
[51] Int. Cl....................................................... B65d 51/16
[50] Field of Search........................................... 137/202,
  199, 43, 173, 423; 220/44

[56] References Cited
UNITED STATES PATENTS
| 2,860,656 | 11/1958 | Eshbaugh....................... | 137/202 |
| 2,966,160 | 12/1960 | Forrester........................ | 137/43 |
| 2,975,793 | 3/1961 | Klank............................. | 137/43 |
| 3,168,103 | 2/1965 | Kochaver....................... | 137/202 |

Primary Examiner—Alan Cohan
Attorneys—John R. Faulkner and Glenn S. Arendsen

ABSTRACT: A vapor manifold corresponding to the shape of the roof of a fuel tank is mounted against the inner surface of the roof. Openings on the underside of the manifold connect the manifold interior with the interior of the fuel tank and valves responsive to the level of the liquid fuel adjacent each opening are mounted at the openings. When the liquid fuel level in the tank rises to the point where liquid fuel could enter the manifold through an opening, the valve at that opening is moved onto a seat to close off communication through the opening. When the liquid fuel level is below the opening, the valve opens to admit fuel vapors into the manifold. A conduit connects the manifold interior via a vapor storage means to the engine combustion chambers.

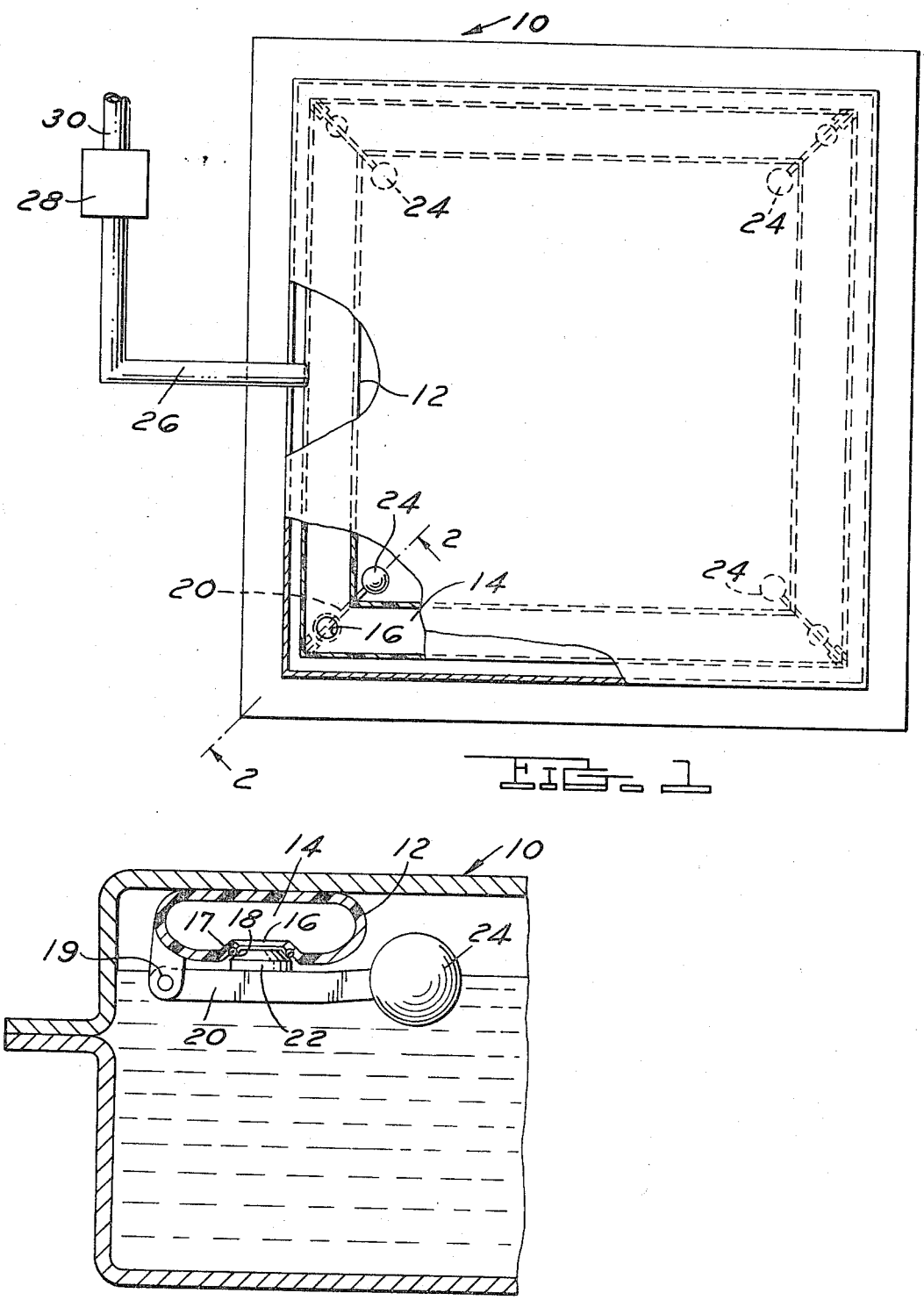

INVENTOR
WILLIAM G. ROVEN
BY
John R. Faulkner
Glenn S. Arendsen
ATTORNEYS

FUEL TANK VAPOR SEPARATOR SYSTEM

BACKGROUND OF THE INVENTION

Evaporation losses from vehicle fuel tanks contribute in some undetermined degree to the contamination of the atmosphere. Various systems have been proposed for burning in the vehicle engine fuel vapors formed above the liquid fuel in the fuel tank. Many of these systems use an absorbent to contain those fuel vapors formed while the vehicle engine is not operating.

The presence of even very small amounts of liquid fuel in these vapor systems interferes significantly with the vapor storage system and with the engine combustion process. A vapor separator system capable of preventing liquid fuel from reaching the storage system thus is an essential part of any such vapor separator system.

SUMMARY OF THE INVENTION

This invention provides a system for separating fuel vapors from liquid fuel that can be mounted entirely within the fuel tank. The system effectively prevents liquid fuel from entering any vapor storing or consuming mechanism for all anticipated fuel tank attitudes. In the system, an enclosed vapor passage is located adjacent the upper surface of the fuel tank. A plurality of openings communicating with the tank interior are formed in the vapor passage adjacent the extremities of the upper surface of the tank. Mounted in each opening is a valve that is responsive to the level of liquid fuel in the tank. The valve closes its opening only when the liquid fuel level is at a point where liquid fuel could enter the opening. When the liquid fuel level is remote from an opening, the valve at that opening permits fuel vapors to enter the vapor passage. A conduit connects the vapor passage with a vapor consuming or storing device and conducts any vapors out of the vapor passage.

The size and the shape of the vapor passage generally corresponds to the tank roof. In fuel tanks having a roof with one relatively narrow horizontal dimension, the vapor passage can be a substantially straight member positioned parallel to the larger dimension of the roof and having openings at each end. A tank having a roof with larger horizontal dimensions requires a vapor passage extending into each corner of the roof. The vapor passage can be a continuous manifold extending along the edges of the tank roof or it can have arms extending into each corner from a centrally located portion. Openings are formed in the lower surfaces of each corner of the manifold to connect the passage in the manifold with the tank interior, and an individual valve is mounted in each opening. The manifold preferably has a relatively flat cross-sectional shape and can be made of polymeric materials, such as a polyethylene or polypropylene, that are compatible with the fuel.

Each valve preferably comprises an arm mounted pivotally to the underside of the manifold outboard of each opening. A valve rod is mounted on the arm at an intermediate location for movement onto a seat surrounding the opening, and a buoyant member is fastened to the inboard end of the arm. When liquid fuel reaches the buoyant member, the buoyant force pivots the arm to move the valve rod onto the seat to close the opening.

The filler pipe for the fuel tank includes a fill limiting device such as that disclosed in application Ser. No. 784,764 filed Dec. 18, 1968, and assigned to the assignee of this application. Briefly, the fill limiting device comprises extending the filler tube into the tank so the opening of the filler tube is a short distance below the roof of the tank and extending a vent tube into the approximate center of the tank so the opening of the vent tube also is a short distance below the tank roof. When the liquid fuel level in the tank during filling reaches the openings of the filler tube and the vent tube, the tank refuses to accept further fuel. A vapor space corresponding to the smaller amount of projection of the vent tube or filler tube below the tank roof thus is maintained in the tank. Further details of construction and operation of the fill limiting device can be found in the above patent application, the disclosure of which is hereby incorporated into this specification.

BRIEF DESCRIPTION OF THE DRAWINGS

FIG. 1 is a plan view of a fuel tank showing the vapor manifold in place on the underside of the tank roof.

FIG. 2 is a perspective cross-sectional view taken through one of the openings in the vapor manifold and showing the preferred pivoting arm type of valve construction.

DETAILED DESCRIPTION

Figure 3:
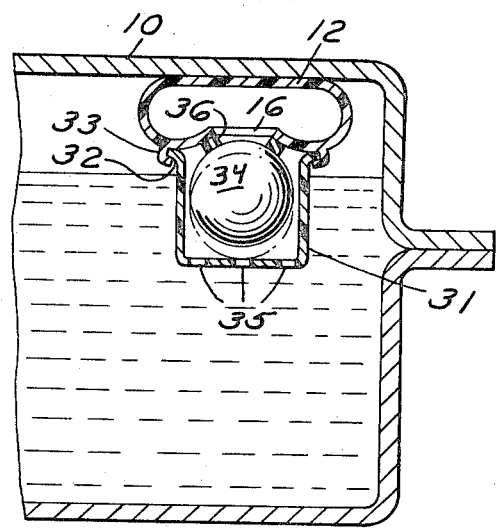
FIG. 3 is a view taken similar to FIG. 2 but showing a valve member comprising a cage mounted on the lower surface of the vapor manifold having a buoyant valve mounted for movement within the cage.

In FIG. 1, a fuel tank having a significant horizontal width and length is represented by numeral 10. Mounted against the undersurface of the roof of tank 10 is a continuous vapor manifold 12 that corresponds substantially to the size and shape of the roof. As shown in FIG. 2, manifold 12 has a relatively flat cross section and can be made of polymeric material such as polyethylene, polypropylene etc. Manifold 12 contains a narrow vapor passage 14 that extends continuously throughout the manifold.

In each corner of the manifold, a small opening 16 is formed in the bottom surface thereof. Openings 16 thus connect the passage 14 with the interior of tank 10. A narrow groove 17 is formed in the material surrounding each opening and a seal 18 which can be an O ring seal, is located in groove 17.

A stud 19 is fastened to the undersurface of manifold 12 outboard of each opening 16 and an arm 20 has one end pivotally mounted to stud 19. Arm 20 projects inwardly across opening 16 and has a valve rod 22 mounted on arm 20 at an intermediate location so rod 22 is movable onto seal 18. When rod 22 is moved onto seal 18, the rod blocks communication between passage 14 and the interior of the tank; the rod permits communication between passage 14 and the tank interior when arm 20 is pivoted to a downward position.

The inner end of arm 20 has a ball 24 made of a material that is buoyant in the fuel intended to be carried in tank 10. Ball 24 typically can be made of foamed or hollow polymeric materials such as polyurethane, etc. Arm 20 preferably curves upwardly so ball 24 is located where the buoyant force applied to the ball by the fuel in the tank moves valve rod 22 onto seal 18 when the fuel level is just below opening 16.

A conduit 26 connects passage 14 in manifold 12 with a valve mechanism 28. Valve mechanism 28 contains three check valves (not shown), two connecting tube 26 with the atmosphere and the third connecting tube 26 with a tube 30 that communicates with vapor storing and consuming devices (not shown). One of the valves connecting tube 26 with the atmosphere opens to admit atmospheric air into tube 26 if a partial vacuum develops within tank 10 and the other acts as an emergency outlet to vent tank 10 to atmosphere when tank pressure exceeds about .7 to 1.2 p.s.i. The valve connecting tube 26 with tube 30 passes fuel vapors from tube 26 to tube 30 when the tank pressure exceeds about 0.3 to 0.5 p.s.i.

The fuel limiting mechanism associated with the filler pipe of tank 10 limits the maximum fuel level in the tank to a level just below the point where buoyant members 24 close openings 16. Thus, when tank 10 is in a level position, passage 14 communicates with the vapor space retained above the liquid fuel level in the tank through each of openings 16.

During vehicle operation, tank 10 will be tilted into a variety of differing attitudes. If the tank is tilted into a forward position in which the liquid fuel level submerges the openings 16 at the front of the tank, the buoyant forces acting on members 24 at the front openings move valve rods 22 onto seals 18 to prevent liquid fuel from entering passage 14. The openings at the rear of the tank still connect passage 14 with the tank interior, and fuel vapors formed above the liquid fuel level are forced by any pressure buildup in tank 10 through the openings into passage 14 and by conduits 26 and 30 to the vapor consuming mechanism of the engine.

Turning to FIG. 3, an alternate valve construction that can be substituted for the valve mechanism shown in FIG. 2 comprises an open cage 31 fastened to the underside of manifold 12 at each of openings 16. Cage 31 can be made of the same polymeric material as manifold 12 and has a projecting ledge 32 at its upper side that snaps into lugs 33 on the bottom of manifold 12.

A buoyant ball 34 is located movably within cage 31 so the ball moves into and out of contact with seat 36 formed around openings 16. A plurality of openings 35 are formed in the bottom of each cage 31; forming such openings only in the bottom of the cage reduces the sensitivity of the ball to fuel sloshing. When the liquid fuel level is below ball 34, ball 34 settles to a lower position in cage 31 that permits communication between passage 14 of manifold 12 and the tank interior. If the fuel level approaches opening 16, the buoyant force applied to ball 34 by the fuel level moves ball 34 onto seat 36 to block communication through openings 16 and thereby prevent liquid fuel from entering passage 14.

Figure 4:
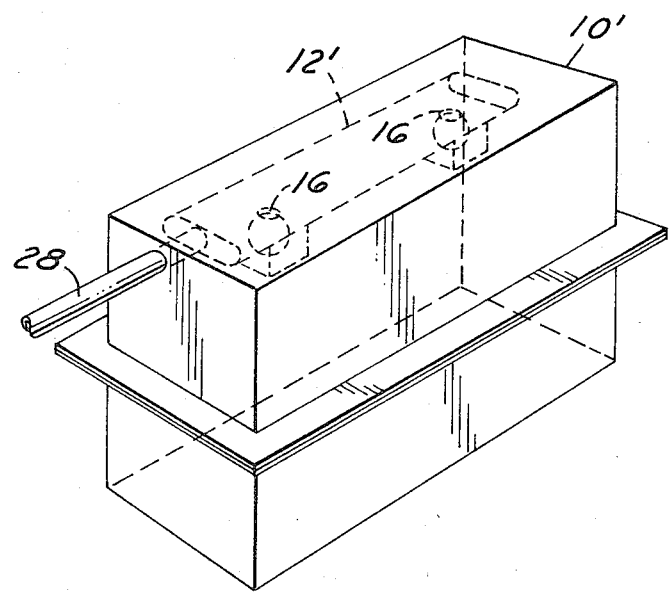
FIG. 4 is a perspective view of a long, narrow fuel tank containing a substantially straight vapor manifold having openings at each end.

In the relatively narrow fuel tank 10' shown in FIG. 4, a straight manifold 12' having a length substantially equaling the length of the larger dimension of the tank roof is positioned against the roof. Manifold 12' has an opening 16 at each end located adjacent the extremities of the tank roof. A valve mechanism responsive to the liquid fuel level as described above is associated with each opening to conduct vapors into the manifold but prevent any liquid fuel from entering the manifold.

Thus this invention provides a vapor separator system that effectively permits removal of any excessive vapors formed above the liquid fuel level in the tank but blocks liquid fuel from the vapor storage or consuming mechanisms for all anticipated tank attitudes and vehicle operating conditions. The system is relatively inexpensive and can be contained within the tank where it is shielded considerably from damage.

I claim:

1. A system for removing vapors from a fuel tank movable into varying attitudes comprising:
   vapor passage means located adjacent the upper surface of the tank, said vapor passage means having a plurality of openings communicating with the interior of the tank, said openings being located adjacent extremities of the upper surface of the tank;
   individual valve means mounted in said openings, each valve means being responsive to the level of liquid fuel in the tank to close its opening only when the liquid fuel level approaches the opening to prevent liquid fuel from entering said vapor passage means, said valve means opening to permit fuel vapors to enter said vapor passage means when the liquid fuel level is remote from its opening; and
   conduit means for conducting vapors out of said vapor passage means.

2. The system of claim 1 in which the vapor passage means has a shape corresponding to the periphery of the roof of the fuel tank and is mounted against said roof, said vapor passage means having an opening at each corner of the tank roof, and a valve means mounted in each opening.

3. The system of claim 2 in which each valve means comprises an arm mounted pivotally to the underside of said vapor passage means, a valve rod mounted on said arm for movement toward said opening, and a buoyant member fastened to said arm, said buoyant member pivoting said arm to move said valve rod toward said opening to close the opening under the buoyant force applied to the buoyant member when the liquid fuel level approaches said opening.

4. The system of claim 3 in which the cross-sectional shape of the vapor storage means has a width substantially greater than its height, said arm having its outer end mounted pivotally to the undersurface of said vapor storage means outboard of said opening in the vapor storage means and the other end projecting across the width of the vapor storage means toward the central portion of the fuel tank, said valve rod being mounted on said arm at an intermediate location and said buoyant member being fastened to the inner end of said arm inside of the laterally inward surface of said vapor storage means.

5. The system of claim 2 in which each valve means comprises a cage mounted to the underside of said vapor storage means at each opening and a buoyant member mounted movably in said cage, said buoyant member resting in said cage away from said opening when the liquid fuel level is remote from said opening, said buoyant member being moved onto said opening to close the opening under the buoyant force applied thereto by said liquid fuel when the liquid fuel level approaches said opening.

6. The system of claim 5 in which said cage has openings connecting the cage interior with the tank interior only in the bottom surface of said cage.

7. The system of claim 1 in which each valve means comprises an arm mounted pivotally to the underside of said vapor passage means, a valve rod mounted on said arm for movement toward said opening, and a buoyant member fastened to said arm, said buoyant member pivoting said arm to move said valve rod toward said opening to close the opening under the buoyant force applied to the buoyant member when the liquid fuel level approaches said opening.

8. The system of claim 1 in which each valve means comprises a cage mounted to the underside of said vapor storage means at each opening and a buoyant member mounted movably in said cage, said buoyant member resting in said cage away from said opening when the liquid fuel level is remote from said opening, said buoyant member being moved onto said opening to close the opening under the buoyant force applied thereto by said liquid fuel when the liquid fuel level approaches said opening.